US005450810A

United States Patent [19]

Knight

[11] Patent Number: 5,450,810

[45] Date of Patent: Sep. 19, 1995

[54] UNDERWATER COMMUNICATION DEVICE AND METHODS

[76] Inventor: Eric A. Knight, 7 Cove Cir., Unionville, Conn. 06085

[21] Appl. No.: 184,221

[22] Filed: Jan. 19, 1994

Related U.S. Application Data

[63] Continuation-in-part of Ser. No. 939,313, Sep. 2, 1992, abandoned.

[51] Int. Cl.[6] ........................ B63C 11/26; G01K 1/10

[52] U.S. Cl. ........................................ 116/26; 116/27; 116/169; 446/418; 446/419

[58] Field of Search .................... 116/26, 27, 152, 155, 116/167, 169, DIG. 44; 446/402, 418, 419; 84/404

[56] References Cited

U.S. PATENT DOCUMENTS

| | | | |
|---|---|---|---|
| 1,394,670 | 10/1921 | DaCosta | 116/155 X |
| 1,401,859 | 12/1921 | Bailey | 446/419 |
| 2,715,296 | 8/1955 | Pettit | 446/418 |
| 3,514,898 | 6/1970 | Price | 446/419 |
| 4,366,956 | 1/1983 | Kifferstein | 446/419 X |
| 4,480,828 | 11/1984 | Kifferstein | 446/419 X |
| 4,566,400 | 1/1986 | Keenan et al. | 116/155 X |
| 4,588,387 | 5/1986 | Swenson | 446/419 X |
| 5,187,691 | 1/1993 | Oehme et al. | 367/134 |
| 5,302,055 | 4/1994 | Johnston | 116/26 X |

*Primary Examiner*—William A. Cuchlinksi, Jr.
*Assistant Examiner*—John L. Beres

[57] ABSTRACT

An underwater communication device that is simple in design, is simple to operate, is powered solely by a user's wrist action, has only one moving part, is maintenance free, can offer multiple modes of operation, can be made resistant to accidental sound generation, can be made neutrally buoyant, offers a wide margin of safety and reliability, and enables underwater communication up to 100 feet between scuba divers. The underwater communication device including a striker rod, a tubular housing and a support and guide member. The support and guide member supporting the rod in the housing. Communicating underwater with the underwater communication device by the steps of grasping the device approximately along its midpoint, and rapidly rocking or shaking the device from side to side or end to end, causing the endpoints of the striker rod to strike an inner surface of the housing, creating a sound that is readily propagated through the water.

10 Claims, 3 Drawing Sheets

UNDERWATER COMMUNICATION DEVICE AND METHODS

This is a continuation-in-part of application 07/939,313 filed on Sep. 2, 1992, now abandoned.

BACKGROUND - FIELD OF THE INVENTION

The present invention is concerned with an underwater communication device, and more specifically a device that is simple in design, is simple to operate, is powered solely by a user's wrist action, has only one moving part, is maintenance free, can offer multiple modes of operation, can be made resistant to accidental sound generation, can be made neutrally buoyant, offers a wide margin of safety and reliability, and enables underwater communication up to 100 feet between scuba divers.

Two methods are also provided for communicating underwater with the present invention. One method is to rapidly rock the device from side to side; another method is to rapidly shake the device from end to end.

BACKGROUND - DESCRIPTION OF RELATED ART

Over the years, many types of underwater communication devices have been developed. However, conventional underwater communication devices have several deficiencies which discourage most scuba divers from using them, and therefore, have not found wide approval and use.

A major problem of many conventional underwater communication devices is that they have multiple moving components, thereby having multiple components that can fail. Scuba divers, considering the riskiness of their hobby or profession, demand the utmost reliability from all of their equipment. To maximize reliability, an underwater communication device should have a minimum number of components that can fail.

Another drawback of most conventional underwater communication devices is that they require maintenance to uphold a specified level of performance and operational reliability. To minimize maintenance effort and expense while maximizing reliability, a scuba diver would certainly prefer an underwater communication device that is maintenance free.

Another flaw of many conventional underwater communication devices is that they have components that are temporarily fastened together. These temporarily fastened components can come apart intentionally, such as to replace a battery, or unintentionally due to use, shock, or vibration. For convenience and safety, a scuba diver would certainly prefer an underwater communication device that can be made as a permanently sealed mechanism.

Another shortcoming of many conventional underwater communication devices is that they require pressing or manipulating a component, such as a button or switch, in order to activate their communication capability. However, many divers wear scuba gloves to protect themselves from such undersea perils as sharp or poisonous coral. These gloves do provide protection, but at the same time reduce the dexterity of the human hand. A gloved diver would thus have increased difficulty operating an underwater communication device that requires the pressing or manipulation of a component. With this in mind, a scuba diver would certainly prefer an underwater communication device that is equally easy to operate with or without gloves.

Yet another disadvantage of some conventional underwater communication devices is that they require the simultaneous use of two hands to operate. For instance, a device with this disadvantage might require one hand to hold the device and the other hand to activate the device's communication capability. In order to keep one hand free to swim, adjust equipment, and perform other routine scuba duties, a scuba diver would certainly prefer an underwater communication device that can be operated with one hand.

Still another drawback of many conventional underwater communication devices is that they are so complex or sufficiently difficult to operate that users must practice with them in order to become proficient in their use. An underwater communication device that would be immediately useful by a diver of any age, physical capability, or skill would certainly be preferred.

Still yet another unfortunate feature of some conventional underwater communication devices is that in order to function they must either replace or be attached to a component of standard scuba gear, such as the second-stage air regulator. Scuba gear modification or component replacement is time consuming and most likely requires technical expertise. An underwater communication device that would not require modifying any piece of scuba gear would certainly be preferred.

Still yet another shortcoming of some conventional underwater communication devices is that they are not designed to provide communication beyond the typical five to ten feet separating pairs of divers. However, there are situations that do require a communication device to function beyond that range. An example of this would be an underwater teaching situation in which a scuba instructor is attempting to attract the attention of multiple students who are at various distances beyond ten feet. In this particular case, and in other cases that could be easily envisioned, an underwater communication device that provides communication further than ten feet would certainly be preferred.

Still yet another major problem of many conventional underwater communication devices is that they require an artificial energy source in order to function. For instance, there are underwater communication devices that require a battery to power the device's electronic or electromechanical components. But batteries are a performance variable; a weak or dead battery can cause the device to not function when needed. Replacing or recharging batteries also increases the effective cost of the device over its life span. Replacing or recharging batteries is also an inconvenience. Another artificial power source for underwater communication devices is air pressure. The required air pressure can be generated by the scuba tank or from some form of mechanical air compressor. If powered by the air from a scuba tank, it will decrease the amount of air available for breathing. If powered by a remote air compressor, such as a gasoline-powered compressor on the deck of a boat feeding air via a long hose, the duration that the device will operate is dependent on the functioning of the air compressor and the amount of fuel available. Fuel usage would also increase the effective cost of the communication device over its life span. A scuba diver would certainly prefer an underwater communication device that does not require electricity, air pressure, or any other artificial energy source to operate.

Still yet another flaw of some conventional underwater communication devices is that they are dangerous to use. For instance, it is known that underwater sounds can be generated by rapping a physically dense object (such as a knife or rock) onto another physically dense object (such as a scuba tank); however, under any circumstance, it is unwise and dangerous to strike a high-pressure cylinder with another dense object; the high-pressure cylinder may rupture and explode. Additionally, an unsheathed knife poses its own safety hazards; a scuba diver may inadvertently cut his or her (or a nearby scuba diver's) air supply hoses, buoyancy compensator, or flesh. A scuba diver would certainly prefer an underwater communication device that offers a wide margin of safety.

Still another deficiency of some underwater communication devices is that they have one or more internal components that can move, contact another component or each other, and create sound - simply due to device repositioning and the influence of gravity. With devices as such, sounds can be inadvertently generated by the simple act of swimming. A scuba diver would certainly prefer an underwater communication device that can be made resistant to accidental sound generation.

And yet another problem of many conventional underwater communication devices is that they are negatively buoyant and sink if accidentally released. A scuba diver would certainly prefer an underwater communication device that can be fashioned to be neutrally buoyant, so it would remain stationary if inadvertently released.

In summary, existing underwater communication devices suffer from one or more of these disadvantages:

(a) are fashioned of multiple moving components that, accordingly, have multiple components that can fail;

(b) require maintenance to uphold a specified level of performance and operational reliability;

(c) have detachable components that can accidentally loosen and come apart;

(d) require buttons, switches, or other activation apparatus to be manipulated;

(e) require the use of two hands to operate;

(f) require practice to achieve proficient use;

(g) require the modification of scuba gear in order to function;

(h) have a communication range limited to the typical five to ten feet separating pairs of divers;

(i) require an artificial energy source to function;

(j) are inherently dangerous to use;

(k) are susceptible to accidental sound generation; and (l) are negatively buoyant and thus sink if accidentally released.

OBJECTS AND ADVANTAGES

The present invention overcomes the stated disadvantages of prior devices and offers significant advantages and uses. Accordingly, several objects and advantages of my invention are:

(a) to provide an underwater communication device which can function with just a single moving component;

(b) to provide an underwater communication device that is maintenance free;

(c) to provide an underwater communication device which can be manufactured as a permanently sealed mechanism;

(d) to provide an underwater communication device that can be used equally well, with or without gloves;

(e) to provide an underwater communication device that can be operated with one hand;

(f) to provide an underwater communication device that can be immediately useful by a diver of any age, physical capability, or skill;

(g) to provide an underwater communication device that can operate without the modification of scuba gear;

(h) to provide an underwater communication device that can offer underwater communication up to 100 feet;

(i) to provide an underwater communication device that can operate without the use of electricity, air pressure, or any other artificial energy source;

(j) to provide an underwater communication device that offers a wide margin of safety;

(k) to provide an underwater communication device that can be manufactured to be neutrally buoyant in either salt or fresh water;

(l) to provide an underwater communication device that can offer multiple modes of operation;

(m) to provide an underwater communication device that can be made resistant to accidental sound generation;

(n) to provide an underwater communication device that can be used to fend off sea animals; and (o) to provide an underwater communication device that is a complete, self-contained, underwater communication system.

Readers will find further objects and advantages of the present invention from a consideration of the ensuing description and the accompanying drawings.

REFERENCE NUMERALS IN THE DRAWINGS

| | |
|---|---|
| 1, 1a | rigid tublar housing |
| 2, 2a | striker rod |
| 3, 3a | motion-control means |
| 4, 4' | sealing means |

DETAILED DESCRIPTION OF THE PREFERRED EMBODIMENTS

Figure 1:
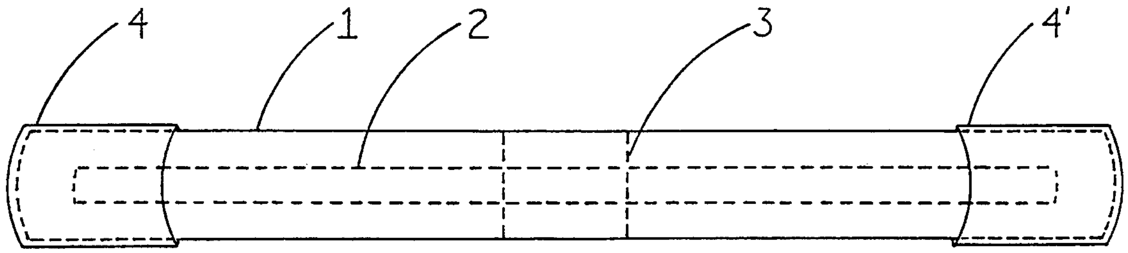
FIG. 1 is a view of one embodiment of the present invention.

A typical embodiment of the underwater communication device is illustrated in FIG. 1. The device has a rigid tubular housing 1 consisting of a tube of rigid material that can withstand the water pressures associated with scuba diving. In this embodiment, rigid tubular housing 1 is made of a 9.0-inch length of 1.0-inch O.D., 0.960-inch I.D. aluminum tubing, available from a variety of commercial sources. However, rigid tubular housing 1 can consist of other materials that can withstand the water pressures associated with scuba diving, such as other metals, fiberglass, graphite, thermoplastic resin, and thermosetting resin.

Inside rigid tubular housing 1 is striker rod 2 which is made of a rigid material. In the preferred embodiment, striker rod 2 is an 8.0-inch long, 0.3125-inch diameter steel rod, available from a variety of commercial sources. However, striker rod 2 can consist of other suitable rigid materials such as other metals, fiberglass, graphite, thermoplastic resin, and thermosetting resin.

To support and guide striker rod 2 in rigid tubular housing 1 is motion-control means 3. In the preferred embodiment, motion-control means 3 is a piece of polyethylene foam "pipe insulation," 2.5-inch O.D., 0.688 inch I.D., 10-inch width, available from Thermwell Products Company, Inc., Los Angeles, Calif. 90058. Motion-control means 3 is placed onto striker rod 2 and positioned to the midpoint of striker rod 2. While manually compressing the polyethylene foam motion-control means 3, the assembly comprised of striker rod 2 and motion-control means 3 is inserted into rigid tubular housing 1 and manipulated until motion-control means 3 is aligned with the midpoint of rigid tubular housing 1.

In addition to polyethylene foam, the motion-control means 3 can be fashioned from other suitable flexible materials such as rubber, synthetic rubber, latex, silicone, polyurethane, polypropylene, vinyl, nylon, leather, various impregnated or laminated fibrous materials, various plasticized materials, cardboard, paper, etc.

To seal rigid tubular housing 1 from water incursion are the sealing means 4 and 4'. In the preferred embodiment, sealing means 4 and 4' are two identical 1.03-inch I.D. plastic caps that are fitted onto the ends of rigid tubular housing 1. Plastic caps, as such, are available from a variety of commercial sources, including the Melard Manufacturing Corporation, Passaic, N.J. However, in addition to caps, sealing means 4 and 4' can consist of plugs, crimps, welds, glues, etc.

Figure 2:
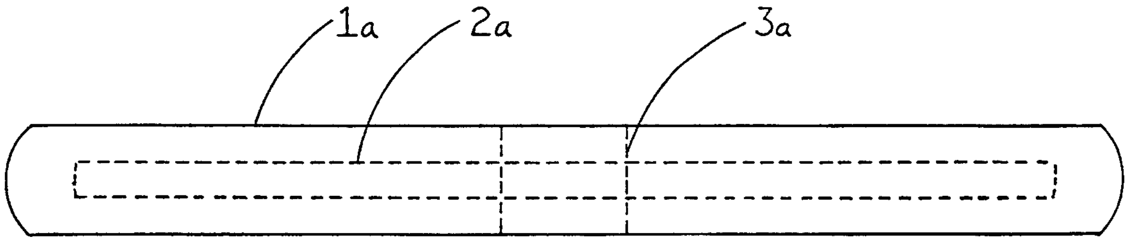
FIG. 2 is a view of another embodiment of the present invention.

An additional embodiment is shown in FIG. 2. The embodiment illustrated in FIG. 2 incorporates rigid tubular housing *1a*, striker rod *2a*, and motion-control means *3a*. Striker rod *2a* and motion-control means *3a* are identical to their counterparts in FIG. 1; rigid tubular housing la, in contrast to FIG. 1, is a one-piece unit. The one-piece unit that comprises rigid tubular housing la inherently provides the sealing means that are separate components in FIG. 1. The rigid tubular housing *1a* may be molded or fashioned of any suitable materials capable of withstanding the water pressures associated with scuba diving, such as thermosetting resin, thermoplastic resin, etc. Motion-control means *3a* is positioned to the midpoint of striker rod *2a*. Rigid tubular housing la is then formed to encapsulate the assembly comprised of striker rod a and motion-control means *3a*; motion-control means *3a* is positioned to coincide with the midpoint of rigid tubular housing *1a*.

OPERATION OF THE PREFERRED EMBODIMENTS

Use of the underwater communication device is remarkably straightforward.

For the embodiment depicted in FIG. 1, there are at least two methods of use.

Figure 3:
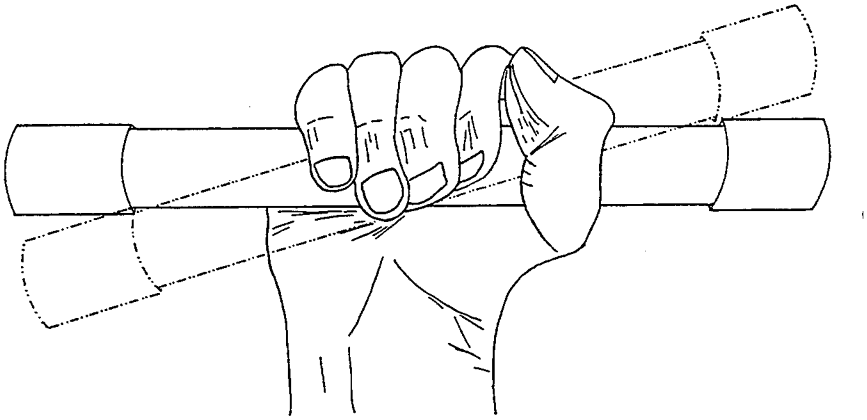
FIG. 3 is a view of a hand holding the embodiment illustrated in FIG. 1, depicting a method of use.

For instance, a user can grasp rigid tubular housing 1 approximately along its midpoint and then rock the device rapidly from side to side; this method of use is seen in FIG. 3. When motion is applied in this fashion, the endpoints of striker rod 2 simultaneously strike the inner surface of rigid tubular housing 1; the sound created by this striking action is then readily propagated through the water.

Figure 4:
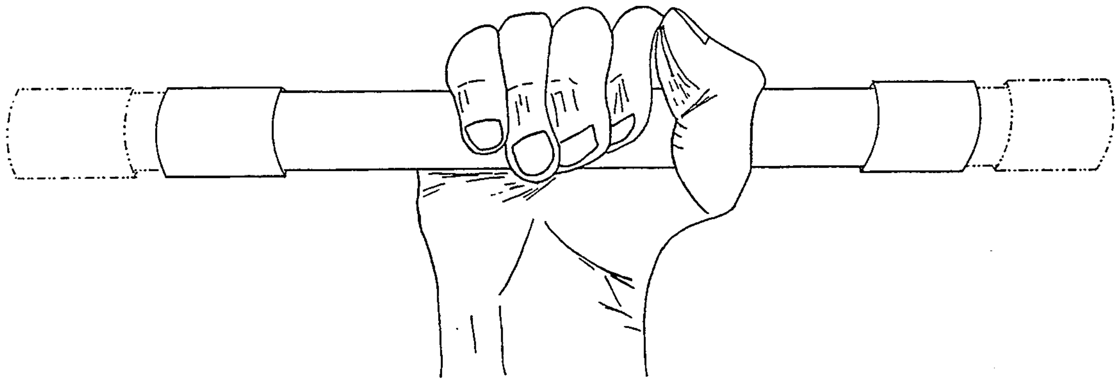
FIG. 4 is a view of a hand holding the embodiment illustrated in FIG. 1, depicting another method of use.

Additionally, a user can grasp rigid tubular housing 1 approximately along its midpoint and then shake the device rapidly from end to end; this method of use is seen in FIG. 4. When motion is applied in this fashion, the endpoints of striker rod 2 alternately strike the interior end portions of the sealing means 4 and 4'; the sound created by this striking action is then readily propagated through the water.

For the embodiment depicted in FIG. 2, there are at least two methods of use.

Figure 5:
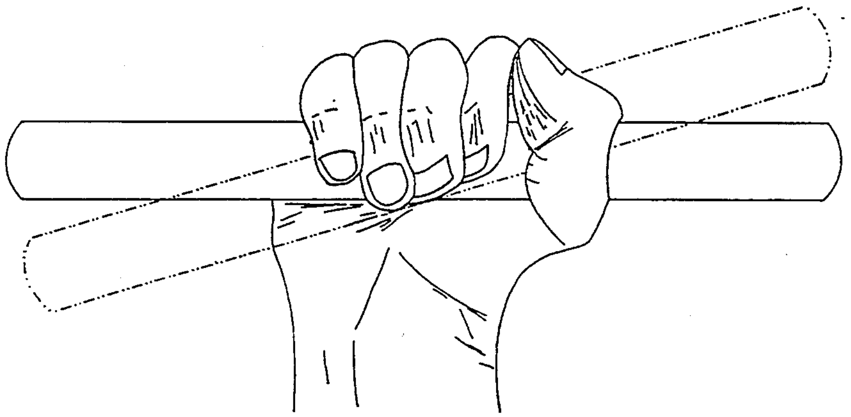
FIG. 5 is a view of a hand holding the embodiment illustrated in FIG. 2, depicting a method of use.

For example, a user can grasp rigid tubular housing *1a* approximately along its midpoint and then rock the device rapidly from side to side; this method of use is seen in FIG. 5. When motion is applied in this fashion, the endpoints of striker rod *2a* simultaneously strike the inner surface of rigid tubular housing *1a*; the sound created by this striking action is then readily propagated through the water.

Figure 6:
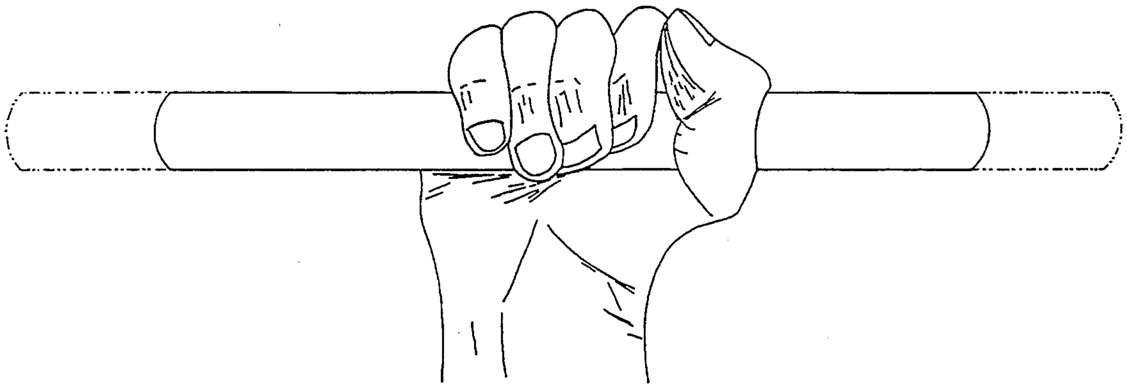
FIG. 6 is a view of a hand holding the embodiment illustrated in FIG. 2, depicting another method of use.

Additionally, a user can grasp rigid tubular housing *1a* approximately along its midpoint and then shake the device rapidly from end to end; this method of use is seen in FIG. 6. When motion is applied in this fashion, the endpoints of striker rod *2a* alternately strike the interior end portions of rigid tubular housing *1a*; the sound created by this striking action is then readily propagated through the water.

SUMMARY, RAMIFICATIONS, AND SCOPE

Accordingly, the reader will see that the present invention provides a simple and effective underwater communication device, offering significant advantages over other designs.

Since the device is powered solely by a user's wrist action and has only one moving component, the invention is very reliable. And since the device's internal mechanism can be permanently sealed within the rigid tubular housing, additional reliability can be achieved. In fact, since there are no parts to clean, adjust, or replace, the device can be considered maintenance free.

The device requires only one hand to operate. Additionally, the device is equally easy to use, whether or not the user is wearing scuba gloves. In fact, the device is so easy to use, it is immediately useful by a diver of any age, physical capability, or skill.

Operation of the device does not require any modification of any piece of scuba gear. The device is a complete, self-contained underwater communication system.

The device also offers a wide margin of safety. Traditional, simple underwater communication methods, such as banging a knife on the side of the high pressure scuba cylinder, are intrinsically dangerous; the diver could accidentally cut himself, herself, another diver, or even one of the air supply hoses; the cylinder could even rupture from the knife's repeated impact. The current invention provides an alternate simple communication method, without the aforementioned risks.

Because the device was designed for a wide range of uses, its communication range is not limited to the typical five to ten feet separating pairs of divers. The device was tested at the diving and research facilities of the Underwater Explorers Society (commonly referred to as UNEXSO), located on Grand Bahama Island, The Commonwealth of the Bahamas, between the dates of Apr. 30, 1992 and May 6, 1992. UNEXSO is one of the largest and most respected diving and research organizations in the world. Ocean testing at UNEXSO, off the coast of Grand Bahama Island, at a variety of depths, validated a communication range of up to 100 feet.

The present invention can provide an underwater communication device that is approximately neutrally buoyant in salt water; and by increasing the rigid tubular housing's length or diameter slightly, and thus increasing the internal air volume, the device can be made neutrally buoyant in fresh water. A neutrally buoyant underwater communication device won't sink or float away if accidentally released; this is a convenient advantage of one embodiment of the present invention.

For versatility and user convenience, the present invention offers multiple methods of operation. A diver can rock or shake the device to create a communication sound. This operational flexibility is substantially due to the novel characteristics of the motion-control means which allows the internal striker rod to exhibit various combinations of radial and axial motion when sufficient motion is applied to the rigid tubular housing.

It should be noted that the radial and axial motion capabilities of the striker rod can be proportioned and tailored to precise needs by simply modifying the friction fits between the striker rod and the motion-control means and between the motion-control means and the rigid tubular housing. For instance, a minimal friction fit between the striker rod and the motion-control means allows the striker rod to traverse the interior of the rigid tubular housing on an axial path. On the other hand, a maximal friction fit between the striker rod and the motion-control means tailors the striker rod to radial motion. And a moderate friction fit between the striker rod and the motion-control means enables both radial and axial striker rod motion.

The motion-control means provides additional beneficial characteristics, such as the invention's resistance to accidental sound generation. For instance, in configurations with moderate friction fits between the striker rod and the motion-control means, the striker rod will not move to strike any interior surface of the device when the invention is simply repositioned. However, when significant additional energy is imparted to the striker rod via intentional acceleration or de-acceleration of the invention (i.e., via rocking or shaking of the invention), the striker rod will move and strike an interior surface of the device. Thus, a diver can conveniently carry the invention while swimming without accidental sounds being generated. However, when the invention is intentionally rocked or shook, it provides a convenient sound-making source.

Because of the rigid, stick-like structure of one embodiment of the underwater communication device, it can also be used to help fend off sea life, such as a shark, that may be threatening the diver.

Although the description above contains many specificities, these should not be construed as limiting the scope of the invention but as merely providing illustrations of some of the presently preferred embodiments of this invention. For example, the rigid tubular housing can have a variety of shapes and dimensions, can be symmetrical or asymmetrical, and can be made of multiple components and materials; the striker rod can have a variety of shapes and dimensions, can be symmetrical or asymmetrical, and can be made of multiple components and materials; the motion-control means can have a variety of shapes and dimensions, can be symmetrical or asymmetrical, can be made of multiple components and materials, and can be located in various positions within the rigid tubular housing; the sealing means can be removable or permanent and be composed of add-on components or intrinsic to the basic design of the invention; the invention can be purposely constructed to be negatively or positively buoyant to suit a particular purpose, etc.

While the invention has been described in detail with respect to the preferred embodiments thereof, it will be appreciated that upon a reading and understanding of the foregoing, certain variations to the preferred embodiments will become apparent, which variations are nonetheless within the spirit and scope of the invention and the appended claims.

I claim:

1. An underwater communication device comprising:
- a) a striker rod,
- b) a rigid tubular housing for said striker rod,
- c) motion-control means for centrally supporting said striker rod within the diameter of said rigid tubular housing and for allowing radial and axial motion of said striker rod when sufficient motion is applied to said rigid tubular housing, and
- d) sealing means for preventing the incursion of water into said rigid tubular housing.

2. The underwater communication device of claim 1 wherein said striker rod is made of steel.

3. The underwater communication device of claim 1 wherein said rigid tubular housing is made of aluminum.

4. The underwater communication device of claim 1 wherein said motion-control means is made of flexible material.

5. The underwater communication device of claim 1 wherein said motion-control means is a piece of polyethylene foam.

6. The underwater communication device of claim 1 wherein said sealing means is selected from the group consisting of caps, plugs, crimps, welds, and glues.

7. The underwater communication device of claim 1 wherein said sealing means is a pair of plastic caps.

8. The underwater communication device of claim 1 wherein said sealing means and said rigid tubular housing are a one-piece unit.

9. A method of communicating underwater with an underwater communication device including a striker rod, a rigid tubular housing and a motion-control means for centrally supporting said striker rod within the diameter of said rigid tubular housing, the method of communicating comprising the steps of:
- a) grasping the device approximately along its midpoint, and
- b) rocking the device rapidly from side to side, causing said striker rod to overcome the motion resistance provided by said motion-control means, thereby allowing the endpoints of said striker rod to simultaneously strike the inner surface of said rigid tubular housing, creating a sound that is readily propagated through the water.

10. A method of communicating underwater with an underwater communication device including a striker rod, a rigid tubular housing and a motion-control means for centrally supporting said striker rod within the diameter of said rigid tubular housing, the method of communicating comprising the steps of:
- a) grasping the device approximately along its midpoint, and
- b) shaking the device rapidly from end to end, causing said striker rod to overcome the motion resistance provided by said motion-control means, thereby allowing the endpoints of said striker rod to alternately strike the interior end portions of the underwater communication device, creating a sound that is readily propagated through the water.

* * * * *